(12) United States Patent
Juzswik

(10) Patent No.: US 8,818,619 B2
(45) Date of Patent: Aug. 26, 2014

(54) METHOD AND APPARATUS FOR DETERMINING TIRE CONDITION USING IDEAL GAS LAW

(75) Inventor: David L. Juzswik, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/565,372

(22) Filed: Aug. 2, 2012

(65) Prior Publication Data

US 2014/0039752 A1    Feb. 6, 2014

(51) Int. Cl.
*B60C 23/00* (2006.01)

(52) U.S. Cl.
USPC .................... 701/34.4; 701/32.9; 701/33.1

(58) Field of Classification Search
CPC ................................. B60C 23/00; G05B 6/05
USPC ....................... 701/32.9, 33.1, 34.4
See application file for complete search history.

(56) References Cited

U.S. PATENT DOCUMENTS

| | | | |
|---|---|---|---|
| 5,569,848 A * | 10/1996 | Sharp | 701/34.4 |
| 6,658,928 B1 * | 12/2003 | Pollack et al. | 73/146 |
| 6,775,632 B1 * | 8/2004 | Pollack et al. | 702/104 |
| 6,823,728 B1 * | 11/2004 | Barnes | 73/146 |
| 6,983,209 B2 * | 1/2006 | Jaynes | 702/50 |
| 6,997,048 B2 * | 2/2006 | Komatsu et al. | 73/146.2 |
| 2004/0017289 A1 * | 1/2004 | Brown, Jr. | 340/442 |
| 2006/0235651 A1 * | 10/2006 | Rimkus et al. | 702/183 |
| 2006/0235652 A1 * | 10/2006 | Rimkus et al. | 702/183 |
| 2008/0135151 A1 * | 6/2008 | Loewe | 152/419 |
| 2010/0127845 A1 * | 5/2010 | Hardman et al. | 340/447 |
| 2010/0288411 A1 * | 11/2010 | Loewe | 152/419 |
| 2012/0007729 A1 * | 1/2012 | Patel et al. | 340/442 |

\* cited by examiner

*Primary Examiner* — Thomas G. Black
*Assistant Examiner* — Donald J Wallace
(74) *Attorney, Agent, or Firm* — Tarolli, Sundheim, Covell & Tummino LLP

(57) ABSTRACT

An apparatus is provided for determining a tire operating condition including a tire-based pressure and temperature sensor and transmitter and a vehicle ignition system. A vehicle-based receiver/controller receives sensor signals and state of the ignition system. The controller provides an error signal when the sensed tire pressure is less than a set threshold value $P_{set}$ and resets the error signal when the sensed tire pressure is greater than a reset threshold value $P_{rst}$. The receiver/controller determines the set threshold value $P_{set}$ and the reset threshold value $P_{rst}$ as a function of a calculated warm tire pressure value $P_{warm}$, determines a mole value N of the tire pressure, and adjusts the determined set threshold value $P_{set}$ and the reset threshold value $P_{rst}$ in response to the vehicle ignition state and a change in the determined mole value N. A display is provided for displaying the error signal.

12 Claims, 2 Drawing Sheets

METHOD AND APPARATUS FOR DETERMINING TIRE CONDITION USING IDEAL GAS LAW

FIELD OF THE INVENTION

The present invention is directed to monitoring the condition of the tires of a vehicle and more particularly to a method and apparatus for determining tire condition using the ideal gas law to control adjustment of warning threshold values.

BACKGROUND

Tire condition monitoring systems are known. A tire condition monitoring system not only enhances vehicle safety by providing tire condition notification to a vehicle operator, it can help reduce $CO_2$ emissions as the vehicle runs more efficiently with properly inflated tires. Known tire condition monitoring systems may include tire-based sensors mounted on the inside of the tire (e.g., attached to the tire rim) for measuring tire conditions such as temperature and pressure. A tire-based transmitter operatively coupled to the tire-based sensor transmits a radio signal to a vehicle-based receiver unit. The transmitted signal may include both temperature and pressure information along with a unique tire identification code. Each tire of the vehicle has its own associated tire identification code. The vehicle-based receiver unit monitors the tire condition signals, the received tire identification code, and controls a display device within the vehicle cabin to warn the vehicle operator when the sensed tire condition(s) are not within predetermined limits. The vehicle-based receiver unit can further indicate which tire location has an out-of-limit tire condition by associating the tire location with the received tire condition signals using the unique tire identification code.

Certain regulations have been proposed for tire pressure monitoring systems (e.g., by the United Nations Economic Commission for Europe ("UNECE") Transportation Division and, in particular, regulation EC R64.02) applicable to certain classes of vehicles. These regulations require that the tire pressure monitoring system must provide a warning to the vehicle operator upon a predetermined percentage pressure loss (e.g., 20% pressure loss) within any one of the vehicle's tires. Since tire pressure is dependent on temperature, detection of a percentage pressure loss can prove difficult. In certain geographic area of the world, it is possible to have a large percentage variation of tire pressure simply due to ambient temperature variations particularly when combined with tire temperature increases during use. The four major factors that influence tire pressure are tire temperature, ambient temperature, ambient atmospheric pressure, and vehicle load conditions. Tire temperature varies during use, ambient temperatures vary over time and location, ambient atmospheric pressure varies according to altitude and weather, and vehicle load varies under use conditions. It is difficult to establish a cold tire pressure value during normal vehicle operation particularly when a vehicle operator inflates a hot tire to a recommended pressure value.

Also, the actual pressure sensing device of the tire-based sensor unit is a manometer that, itself, has a measurement tolerance that further complicates a determination of a particular percentage pressure lose in the tire. An improper determination of a pressure loss resulting from temperature variations and sensor (manometer) error can lead to false alarm notifications to the vehicle operator thereby harming the credibility of the tire condition monitoring system.

SUMMARY OF THE INVENTION

The present invention provides a method and apparatus for determining tire condition using the ideal gas law. The present invention determines a change in the moles of gas within each tire and adjusts pressure threshold warning values in response thereto.

In accordance with one example embodiment of the present invention, an apparatus is provided for determining a tire operating condition comprising a tire-based sensor for sensing tire pressure and temperature and transmitting a signal indicative thereof and a vehicle ignition system. A vehicle-based receiver/controller is provided for receiving the signal from the tire-based sensor and for detecting the state of the vehicle ignition system. The controller provides an error signal when the sensed tire pressure is less than a set threshold value $P_{set}$ and resets the error signal when the sensed tire pressure is greater than a reset threshold value $P_{rst}$. The receiver/controller determines the set threshold value $P_{set}$ and the reset threshold value $P_{rst}$ as a function of a calculated warm tire pressure value $P_{warm}$, determines a mole value N of the tire pressure, and adjusts the determined set threshold value $P_{set}$ and the reset threshold value $P_{rst}$ in response to the vehicle ignition state and a change in the determined mole value N. A display is provided for displaying the error signal from the vehicle-based receiver/controller.

In accordance with another example embodiment of the present invention, a method determines a tire operating condition comprising the steps of sensing tire pressure, sensing tire temperature, and providing a signal indicative of the sensed tire pressure and tire temperature. The state of the vehicle ignition system is sensed. An error signal is provided when the sensed tire pressure is less than a set threshold value $P_{set}$, and the error signal is reset when the sensed tire pressure is greater than a reset threshold value $P_{rst}$. The method further includes the steps of calculating warm tire pressure value $P_{warm}$, determining the set threshold value $P_{set}$ and the reset threshold value $P_{rst}$ as a function of the calculated warm tire pressure value $P_{warm}$, determining a mole value N of the tire pressure, and adjusting the determined set threshold value $P_{set}$ and the resent threshold value $P_{rst}$ in response to the vehicle ignition state and a change in the determined mole value N. The provided error signal is displayed for the vehicle operator.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
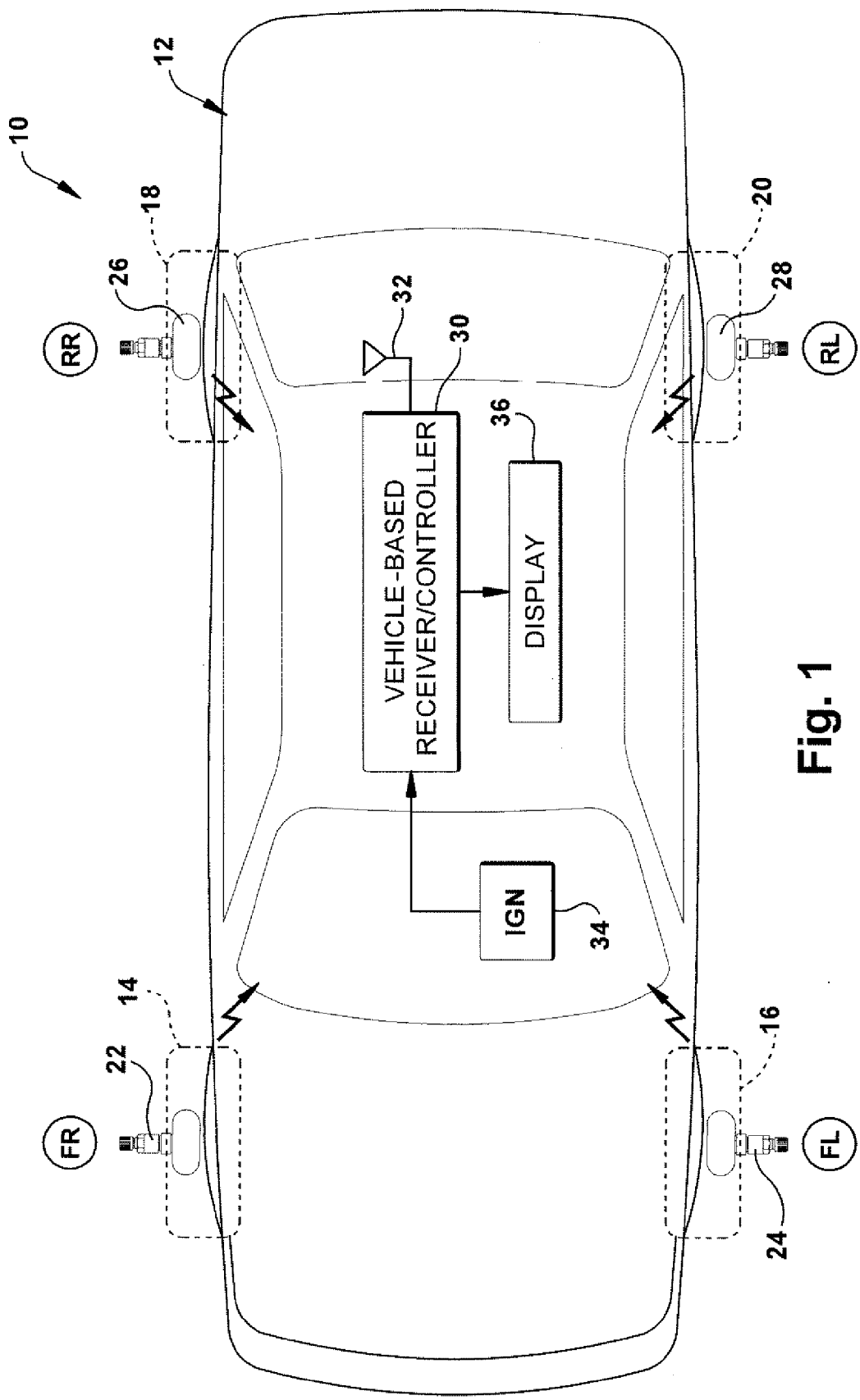
FIG. 1 is a schematic diagram of a vehicle having a tire pressure monitoring system made in accordance with one example embodiment of the present invention.

Referring to FIG. 1, a tire condition monitoring system ("TCMS") 10, made in accordance with one example embodiment of the present invention, is shown for use on a vehicle 12. The TCMS 10, in accordance with this example embodiment, is designed to measure tire operating conditions including pressure and temperature and to provide a warning to a vehicle operator when tire pressure is not within a predetermined limit. In the art, TCMS are also referred to as tire pressure monitoring systems ("TPMS") even though the system may monitor temperature as well as pressure and/or any other desired tire operating characteristic.

The vehicle 12 includes four tires 14, 16, 18, and 20 located at the front right ("FR") corner of the vehicle, the front left ("FL") corner of the vehicle, the rear right ("RR") corner of the vehicle, and the rear left ("RL") corner of the vehicle, respectively. Each tire 14, 16, 18, and 20 has an associated tire-based tire condition sensor unit 22, 24, 26, and 28, respectively. Each tire-based tire condition sensor unit includes an associate pressure sensor (not shown) and a temperature sensor (not shown) for sensing its tire's associated pressure and temperature, respectively. Each tire-based tire condition sensor unit 22, 24, 26, and 28 further includes a radio transmitter (not shown) for transmitting an electrical signal. The electrical signal transmitted from each tire-based tire condition sensor unit is typically a coded signal including the measured pressure and temperature information along with unique tire identification ("transmitter ID") information. Since each of the tire-based tire condition sensor units has an associated transmitter ID and each sensor unit is associated with a single tire, the transmitter ID is also referred to as the tire ID. The transmitted signal from each of the tire-based tire conditions sensor units may be in the form of a digital code modulation format such as amplitude shift key ("ASK"), frequency shift key ('FSK'), etc., carried on a radio frequency ("RF") signal, known in the art as a carrier frequency.

The vehicle 12 further includes a vehicle-based receiver/controller 30 having a receiving antenna 32 for receiving and processing the signals from each of the tire-based tire condition sensor units 22, 24, 26, and 28.

The vehicle-based receiver/controller 30 is connected to the vehicle ignition 34 for monitoring the state of the vehicle ignition, i.e., is the ignition ON or OFF. In response to the received pressure and temperature information from the tire-based tire condition sensor units 22, 24, 26, and 28, the vehicle-based receiver/controller 30 controls a display 36 located in the vehicle cabin so that it can display tire condition (e.g., warning) information to the vehicle operator. Since each tire-based condition sensor unit has a unique ID, the vehicle-based receiver/controller 30 can associate each unique sensor ID with the tire position or location on the vehicle and thus provide an indication to the vehicle operator which tire has an improper tire condition value, e.g., an improper tire pressure value.

Figure 2:
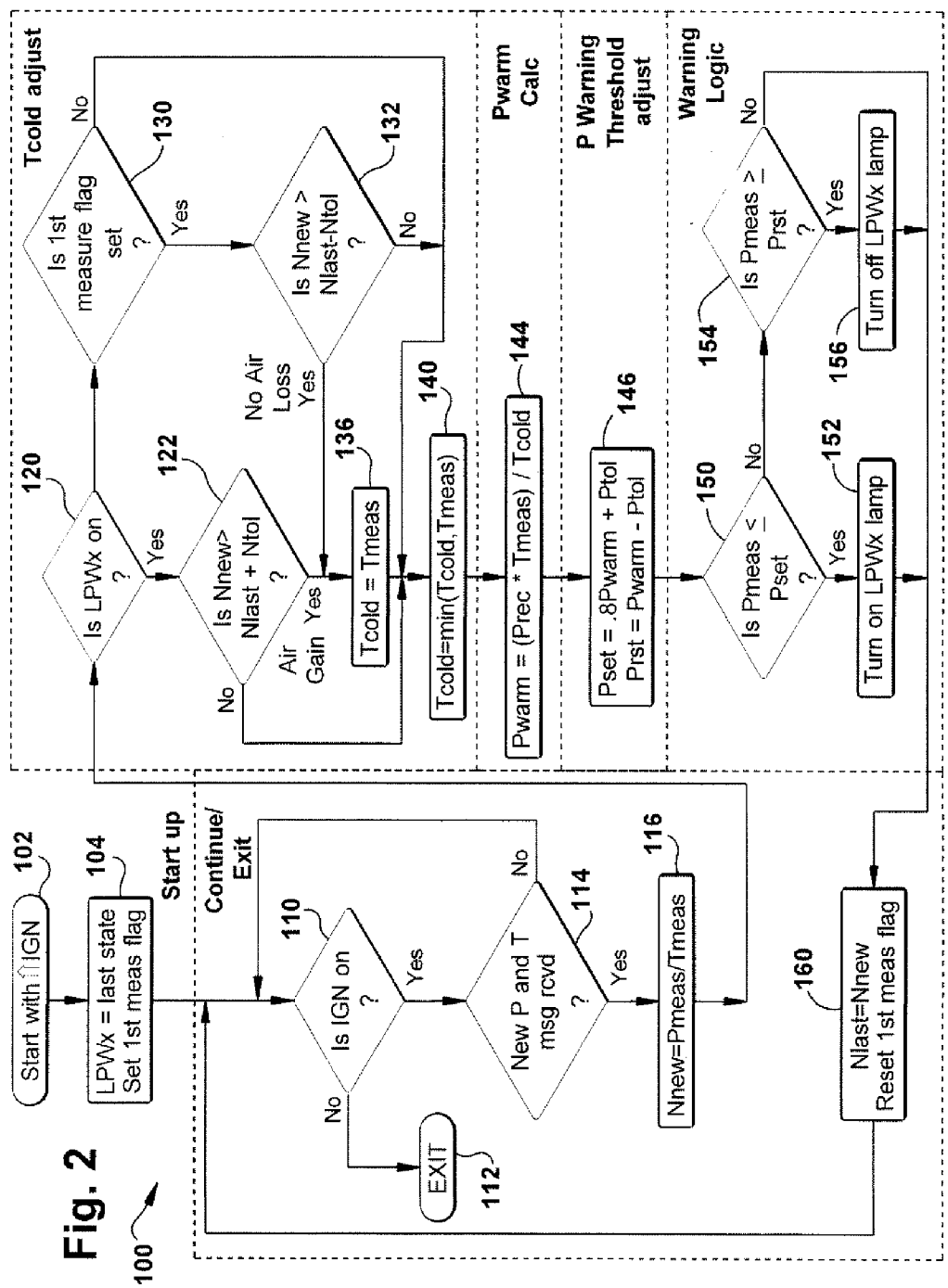
FIG. 2 is a flow chart depicting a control process in accordance with one example embodiment of the present invention for operating the tire pressure monitoring system of FIG. 1

Referring to FIG. 2, a control process followed by the vehicle-based receiver/controller 30 is shown. This control process is described using the following particular nomenclature.

$P_{rec}$ is a recommended cold tire inflation pressure. The vehicle manufacturer, for a particular vehicle, often specifies the $P_{rec}$ for the intended service conditions such as speed and load. The $P_{rec}$ is often displayed on a placard located on the driver's inside door frame and/or set forth in the owner's manual. All the tires of the vehicle may not have the same $P_{rec}$ since, typically, the recommended pressure is tire location dependent, e.g., the front located tires may have a different $P_{rec}$ than the rear located tires.

$P_{meas}$ is the last pressure measurement by the associated tire-based condition sensor unit.

$T_{meas}$ is the last temperature measurement by the associate tire-based condition sensor unit.

$T_{cold}$ is a base-line temperature reference value. Since $P_{rec}$ is based on a cold tire condition and $T_{cold}$ is a value that can change depending on ambient conditions, the $T_{cold}$ value, in accordance with the present invention, must be learned and updated by the control process. Also, in accordance with the present invention, set and reset threshold values (both a set value to trigger an alarm and a reset value to reset the alarm) are adjusted according to the $T_{cold}$ value. In effect, $T_{cold}$ provides a system base-line for alarm set and reset threshold values. $T_{cold}$, in accordance with an example embodiment of the present invention, under certain conditions, is set equal to the lower of the last $T_{cold}$ or $T_{meas}$ value or is set equal to $T_{meas}$.

$P_{warm}$ is an in-service operating pressure value equal to the inflation pressure that is elevated (a value typically greater than $P_{rec}$) due to increased temperature effects that occur during vehicle use. $P_{warm} = P_{rec}$ (in absolute kpa)*$T_{meas}$/$T_{cold}$ (in Kelvin). Also, $P_{warm}$ is always ≥$P_{rec}$.

$P_{tol}$ is the pressure sensor measurement error (tol=tolerance) constant, e.g., 10 kpa.

$P_{set}$ is a pressure threshold value set so that if $P_{meas}$ is i less than or equal to $P_{set}$, the system will provide a low pressure warning, i.e., will turn ON the error indication on the display 36. In accordance with the described example embodiment of the present invention, $P_{set} = 0.8 P_{warm} + P_{tol}$. Also, $P_{set}$ must be greater than a predetermined minimum value such as 150 kpag (250 kpa).

$P_{rst}$ is a reset pressure threshold value set so that if $P_{meas}$ is greater than or equal to $P_{rst}$, a low pressure warning indication would be reset, i.e., would turn OFF any error indication on the display 36. $P_{rst} = P_{warm} - P_{tol}$. Also, $P_{rst}$ must be greater than $P_{set}$.

$N_{new}$ is the relative mole count (a calculated value) based on the last measurement of $P_{meas}$ and $T_{meas}$, i.e., $N_{new} = P_{meas}$ (in kpa)/$T_{meas}$ (in Kelvin). This is the simplified form of the ideal gas law (PV=NRT) since R is a constant and, for a radial tire, V can be considered a constant.

$N_{last}$ is the relative mole count (a calculated value) based on the previous calculation.

$N_{tol}$ is the relative mole count error (tol=tolerance) due to tire and sensor temperature lag differences, e.g., $N_{tol} = 10$ (kpa)/$T_{meas}$ (Kelvin).

$\Delta N$ is a change in mole count. The $\Delta N$ value provides an indication if there has been a pressure loss (e.g., due to an air leak in the tire) or a pressure gain (e.g., due to an operator adding air to the tire). A change in mole count, in accordance with the example embodiment of the present invention is determined from:

(1) a determination as to whether $N_{new} > N_{last} + N_{tol}$ (a negative indicates no air gain, and an affirmative indicates an air gain), or (2) a determination as to whether $N_{new} > N_{last} - N_{tol}$ (a negative indicates an air loss, and an affirmative indicates no air loss).

It should be appreciated that there typically is no RF transmissions when there is an air gain and the vehicle is at rest, so $\Delta N$ will typically be greater than $N_{tol}$ if air is added to the tire.

$P_{min}$ is a minimum cold tire inflation pressure of the tire specified for a given service condition.

$T_{meas}$ is a measured temperature of the tire.

$T_{amb}$ is the ambient temperature.

$\Delta T$ is the difference between measure and ambient temperatures and can be determined by $\Delta T = T_{meas} - T_{amb}$.

In accordance with the present invention, it has been discovered that the ideal gas law can be used to determine the mole value of the air inside of a tire and used in monitoring a pressure loss or gain by determining a change in gas mole value, i.e., a $\Delta$mole ($\Delta N$) value. A change in the mole value is used to control the "learning" of a $T_{cold}$ value which, in turn, is used to adjust alarm set and reset threshold values. The ideal gas law is PV=NRT, where P is pressure, V is volume, N is the number of moles of gas, R is the ideal gas constant functionally related to Boltzmann's constant and Avogadro's constant, and T is the temperature above absolute zero (i.e., above 0 degrees Kelvin). For a given radial tire on a rim, the volume of the tire is substantially constant over a wide range of temperatures and pressures. Since V can be assume constant (again, true for a radial tire) and R is a constant, the number of moles N for a particular tire can be approximated as N=P/T. A change in the mole count, i.e., Δmoles (ΔN), is used to trigger an adjustment or to learn a new value for $T_{cold}$, which, in turn, is used to adjust the values of the thresholds for providing a warning and resetting a warning indication of a low tire pressure condition. The present arrangement permits a robust determination of a gas loss of 20% even with changing tire temperature during vehicle use.

Referring to FIG. 2, the control process 100 performed by the vehicle-based receiver/controller 30, in accordance with one example embodiment of the present invention, is shown. The vehicle-based receiver/controller 30 can be a microcomputer, a microprocessor along with necessary peripheral circuitry, discrete circuitry designed to perform the needed functions of the control process, or an application specific integrated circuit ("ASIC") designed to perform the specific functions of the present invention.

The process 100 begins with a start-up function beginning at step 102 when the vehicle ignition is first turned ON. In this described control process flow chart, each of the four tires 14, 16, 18, and 20 is generically referred to as tire "x". The vehicle-based receiver/controller 30 keeps track of each tire pressure condition (i.e., whether a tire pressure is less than a predetermined minimum value) and "remembers" by setting an internal flag within its memory. If a tire has been previously determined to have less than a predetermined value, a low pressure warning ("LPW") condition flag would have been previous set and the flag condition retained in step 104. The vehicle-based receiver/controller 30 has a low pressure warning flag for each of the tires generically referred to as LPWx. If the vehicle 12 has four tires, there are flags for LPW1, LPW2, LPW3, and LPW4. The control process 100 is performed for each tire of the vehicle individually. For purposes of explanation, a tire "x" is generically referred to in the process, it being understood that the same process is performed for each of the tires.

In step 104, the LPWx flag for each of the tires is set to its last previous state. If any of the LPWx flags are TRUE or ON, that means that a low pressure condition has been previous determined to exist during the last ignition cycle. If the LPWx flag is FALSE or OFF, a low pressure condition for that tire did not exist for the last ignition cycle of the vehicle. In effect, the vehicle-based receiver/controller 30 will control the display 36 to continue to display a low pressure indication for the particular tire that was last set when the vehicle was last operated, i.e., simply turning OFF the ignition and restarting the vehicle will not reset a low pressure indication.

Also, in step 104, a first measurement flag is set to an ON condition when the vehicle is first started. As will be appreciated, in a later portion of the control process, this first measurement flag setting is used to control whether certain process steps are performed, i.e., certain described process steps only occur a first time through the control process after an IGN ON condition occurs. The setting of the first measurement flag in step 104 is used to identify a first pass through of the control process after the ignition is first started.

The process next proceeds to step 110 where an inquiry is made as to whether the vehicle ignition is ON. If not, the process ends at step 112. If the ignition is determined to be ON in step 110, a determination is made in step 114 as to whether a measurement signal has been received from the tire x of interest, i.e., has a new pressure information $P_{meas}$ and a new temperature information $T_{meas}$ been received, from the associated tire-based tire condition sensor unit. The process 100 is carried out for each of the four tires, but, for explanation purposes, the control process 100 is being described as it applies to one tire. If the determination in step 114 is negative, the process returns to step 110 until the determination in step 114 is affirmative.

From an affirmative determination in step 114, i.e., the ignition is ON and a new pressure and temperature signal is received, the process determines a new mole count value $N_{new}=P_{meas}/T_{meas}$. As mentioned above, in a radial tire, the volume V is substantially constant over a vast range of pressure and temperature values and since the ideal gas constant R is constant, a reliable determination of the number of moles N of gas or air in the tire is equal to $P_{meas}/T_{meas}$ is determined in step 116. From step 116, a determination is made in step 120 as to whether a low pressure warning for tire x ("LPWx") is ON. If the determination in step 120 is affirmative, a determination is made in step 122 as to whether the new determined mole value $N_{new}$ determined in step 116 is greater than the last determined mole value $N_{last}$ plus the mole count error tolerance $N_{tol}$ (where $N_{tol}=10$ (kPa)/$T_{meas}$(Kelvin)), i.e., is $N_{new}>N_{last}+N_{tol}$? If the determination is affirmative, this means that air has been added to the vehicle tire. It should be appreciated that the determination in step 122 is a Δmole (ΔN) determination and is determining if air has been added to the tire.

If the determination in step 120 is negative, the process proceeds to step 130 where a determination is made as to whether the first measurement flag set from step 104 is ON, i.e., is this the first pass through the control process since the ignition was first turned ON. If the determination in step 130 is affirmative, the control process 100 proceeds to step 132 where a determination is made as to whether the new mole value $N_{new}$ determined in step 116 is greater than $N_{last}$ minus $N_{tol}$, i.e., is $N_{new}>N_{last}-N_{tol}$? Again, it should be appreciated that step 132 is another Δmole (ΔN) determination, this time determining whether there is a decrease in the mole count. If the determination in step 132 is affirmative, this indicates that there has been no air loss. From affirmative determinations in steps 122 or 132, the process proceeds to step 136 where a new $T_{cold}$ value is set equal to the measured temperature $T_{meas}$. In effect, the new $T_{cold}$ value learned in step 136, i.e., set equal to $T_{meas}$, occurs when there has been an error flag previously set and when there has been a pressure gain (steps 120, 122), as when the vehicle operator adds air to the tire, or when there has been a first pass through the control process and there has been no air loss (steps 130, 132). From negative determinations in any of steps 122 (no air gain), 130 (not a first pass through the control process), or 132 (a pressure loss), or from step 136, the process proceeds to step 140 where the value for $T_{cold}$ is set equal to the $T_{cold}$ value determined in step 136 or the $T_{meas}$ value from step 114, whichever is less.

From step 140, $P_{warm}$ is calculated in step 144 equal to $(P_{rec}*T_{meas})/T_{cold}$. After $P_{warm}$ is determined in step 144, threshold values $P_{set}$ and $P_{rst}$ for control of the ON and OFF, respectively, of the warning indication provided by display 36 are calculated in step 146. $P_{set}$ is the set threshold value. When the measured pressure is less or equal to the set threshold value $P_{set}$, the pressure warning indication for that particular tire is turned ON. If the pressure warning indication is turned ON and the measured pressure is greater than or equal to the reset pressure threshold value $P_{rst}$, the pressure warning indication is turned OFF. In accordance with step 144, $P_{set}=0.8P_{warm}+P_{tol}$ and $P_{rst}=P_{warm}-P_{tol}$.

After the warning indication control thresholds are determined in step 146, a determination is made in step 150 as to whether the measured pressure $P_{meas}$ is less than or equal to the warning indication set threshold $P_{set}$. If the determination in step 150 is affirmative, the process proceeds to step 152 wherein the low pressure warning indication for tire x is turned ON so as to warn the vehicle operator of a low pressure condition. From a negative determination in step 150, i.e., the measured pressure is not less than or equal to the pressure needed to turn the display indicator ON, the process makes a determination in step 154 whether the measured pressure $P_{meas}$ is greater than or equal to the reset pressure value $P_{rst}$. If the determination in step 154 is affirmative, the low pressure warning indication on the display 36 is turned OFF in step 156. From either steps 152 or 156, or from a negative determination in step 154, the process proceeds to step 160 where the last mole count value $N_{last}$ is set equal to the new mole count $N_{new}$ determined in step 116. Also, in step 160, the first measurement flag is reset. With the first measurement flag reset, the next time through the control process, the determination in step 130 will be negative and will stay negative until the ignition is turned OFF and then turned ON again. From step 160, the process loops back to step 110.

It should be appreciated that $P_{set}$ and $P_{rst}$ being determined as a function of $P_{warm}$, in accordance with the present invention, will satisfy the present European Commonwealth regulation EC R64.02. Without the present invention, it should be appreciated that, if a tire has an elevated tire temperature due to driving and leaks air so as to result in a tire pressure warning indication, the driver may add air to the $P_{rec}$ value. However, in this case without the present invention, since $P_{set}$ and $P_{rst}$ would be elevated due to tire heating, the warning lamp may not extinguish even after the tire is filled thereby confusing the driver. However, with the method and apparatus of the present invention, decision block 122 allows a new tire cold reference temperature at the current temperature, which will bring the $P_{warm}$ value back down to $P_{rec}$, and bring $P_{set}$ and $P_{rst}$ back down which would result in the warning lamp turning OFF when the tire is filled. If the ignition had just been turned ON and there had been an air loss in the tire since the last time the ignition ON condition, $P_{set}$ and $P_{rst}$ will not be reduced unless the tire temperature had been reduced.

From this control process, it should be appreciated that this arrangement provides an adherence to the present EC regulation requirements without the possibly confusing a driver who is refilling a hot tire. Also, it should be appreciated that an external temperature sensor is not needed nor does a module have to remain ON while the ignition is OFF to determine if the tires have cooled down prior to determining a new $T_{cold}$ value for the tires.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for determining a tire operating condition comprising:
    a tire-based sensor for sensing tire pressure and temperature and transmitting a signal indicative thereof;
    a vehicle ignition system;
    a vehicle-based receiver/controller for receiving the signal from the tire-based sensor and for detecting the state of the vehicle ignition system, said controller providing an error signal when the sensed tire pressure is less than a set threshold value $P_{set}$ and resetting the error signal when the sensed tire pressure is greater than a reset threshold value $P_{rst}$, the vehicle-based receiver/controller determining the set threshold value $P_{set}$ and the reset threshold value $P_{rst}$ as a function of a calculated warm tire pressure value $P_{warm}$, determining a mole value N of the tire pressure and adjusting the determined set threshold value $P_{set}$ and the reset threshold value $P_{rst}$ in response to the vehicle ignition state and a change in the determined mole value N; and
    a display the displaying the error signal from the vehicle-based receiver/controller.

2. The apparatus of claim 1 wherein said mole count N is equal to the sensed tire pressure divided by the sensed tire temperature.

3. The apparatus of claim 1 wherein said vehicle-based receiver/controller calculates the warm tire pressure value $P_{warm}$ equal to a recommended tire pressure value $P_{rec}$ times a measured tire temperature value $T_{meas}$ divided by a learned value of cold tire pressure temperature $T_{cold}$.

4. The apparatus of claim 3 wherein learned value the cold tire pressure temperature $T_{cold}$ is adjusted in response to a change in the determined mole value N.

5. The apparatus of claim 3 wherein the set threshold $P_{set}=P_{warm}$ plus a pressure tolerance value $P_{tol}$.

6. The apparatus of claim 3 wherein the reset threshold $P_{rst}=P_{warm}$ minus a pressure tolerance value $P_{tol}$.

7. A method for determining a tire operating condition comprising the steps of:
    sensing tire pressure;
    sensing tire temperature;
    providing a signal indicative of the sensed tire pressure and tire temperature;
    sensing a state of the a vehicle ignition system;
    providing an error signal when the sensed tire pressure is less than a set threshold value $P_{set}$;
    resetting the error signal when the sensed tire pressure is greater than a reset threshold value $P_{rst}$;
    calculating warm tire pressure value $P_{warm}$
    determining the set threshold value $P_{set}$ and the reset threshold value $P_{rst}$ as a function of the calculated warm tire pressure value $P_{warm}$;
    determining a mole value N of the tire pressure;
    adjusting the determined set threshold value $P_{set}$ and the reset threshold value $P_{rst}$ in response to the vehicle ignition state and a change in the determined mole value N; and
    displaying the provided error signal for the vehicle operator.

8. The method of claim 7 wherein said step of determining a mole value N is determined by dividing the sensed tire pressure by the sensed tire temperature.

9. The method of claim 7 wherein said step of calculating the warm tire pressure value $P_{warm}$ includes multiplying a recommended tire pressure value $P_{rec}$ times a measured tire temperature value $T_{meas}$ divided by a learned value of cold tire pressure temperature $T_{cold}$.

10. The method of claim 9 wherein learned value the cold tire pressure temperature $T_{cold}$ is adjusted in response to a change in the determined mole value N.

11. The method of claim 9 wherein the set threshold $P_{set}$ is set equal to $P_{warm}$ plus a pressure tolerance value $P_{tol}$.

12. The method of claim 9 wherein the reset threshold $P_{rst}$ is set equal to $P_{warm}$ minus a pressure tolerance value $P_{tol}$.

* * * * *